United States Patent [19]

Rufolo

[11] Patent Number: 5,008,075
[45] Date of Patent: Apr. 16, 1991

[54] PREVENTATIVE MAINTENANCE SYSTEM FOR UNDERWATER PIPES

[76] Inventor: Paul G. Rufolo, 149 Gregory St., Mt. Prospect, Ill. 60056

[21] Appl. No.: 479,337

[22] Filed: Feb. 13, 1990

Related U.S. Application Data

[63] Continuation-in-part of Ser. No. 464,958, Jan. 16, 1990, abandoned.

[51] Int. Cl.⁵ .............................. B08B 17/02
[52] U.S. Cl. ........................... 422/6; 210/170; 210/198.1; 210/749; 210/752; 210/764; 422/14; 422/257; 422/292
[58] Field of Search ............. 422/6, 14, 257, 292; 210/749, 752, 764, 163, 170, 198.1

[56] References Cited

U.S. PATENT DOCUMENTS

| | | | |
|---|---|---|---|
| 333,204 | 12/1885 | Dolbeer | 422/6 |
| 1,445,839 | 2/1923 | Mahoney | 422/6 |
| 1,890,712 | 12/1932 | Zeitz . | |
| 2,138,831 | 12/1938 | Brammer | 422/6 |
| 3,120,491 | 2/1964 | Kincaid . | |
| 3,398,831 | 8/1968 | Jones . | |
| 3,441,439 | 4/1969 | Eagell | 422/6 |
| 4,178,245 | 12/1979 | Nakaoka et al. . | |
| 4,259,269 | 3/1981 | Flowers . | |
| 4,310,423 | 1/1982 | Brown et al. . | |
| 4,313,827 | 2/1982 | Ratigan et al. . | |
| 4,328,638 | 5/1982 | Smithson . | |
| 4,529,518 | 7/1985 | Jackson . | |
| 4,556,486 | 12/1985 | Merket . | |
| 4,582,610 | 4/1986 | Baker . | |
| 4,818,413 | 4/1989 | Hoover et al. | 422/14 |
| 4,857,209 | 8/1989 | Lyons et al. . | |

FOREIGN PATENT DOCUMENTS 2189712A 5/1986 United Kingdom .

Primary Examiner—Robert J. Warden
Assistant Examiner—Timothy M. McMahon
Attorney, Agent, or Firm—Welsh & Katz, Ltd.

[57] ABSTRACT

An apparatus for dispersing chemicals into an underwater pipe comprising first and second chemical feed pipes, the feed pipes being mounted to an intake pipe forming part of the underwater pipe, the first feed pipe extending along the length of the intake pipe and being connected to the second feed pipe, the second feed pipe being mounted to the intake pipe at that portion of the intake pipe adjacent an intake pipe opening, the second feed pipe including a plurality of inwardly extending releasing valves for dispensing chemicals into the intake pipe, the chemicals being delivered to the second feed pipe through the first feed pipe.

33 Claims, 5 Drawing Sheets

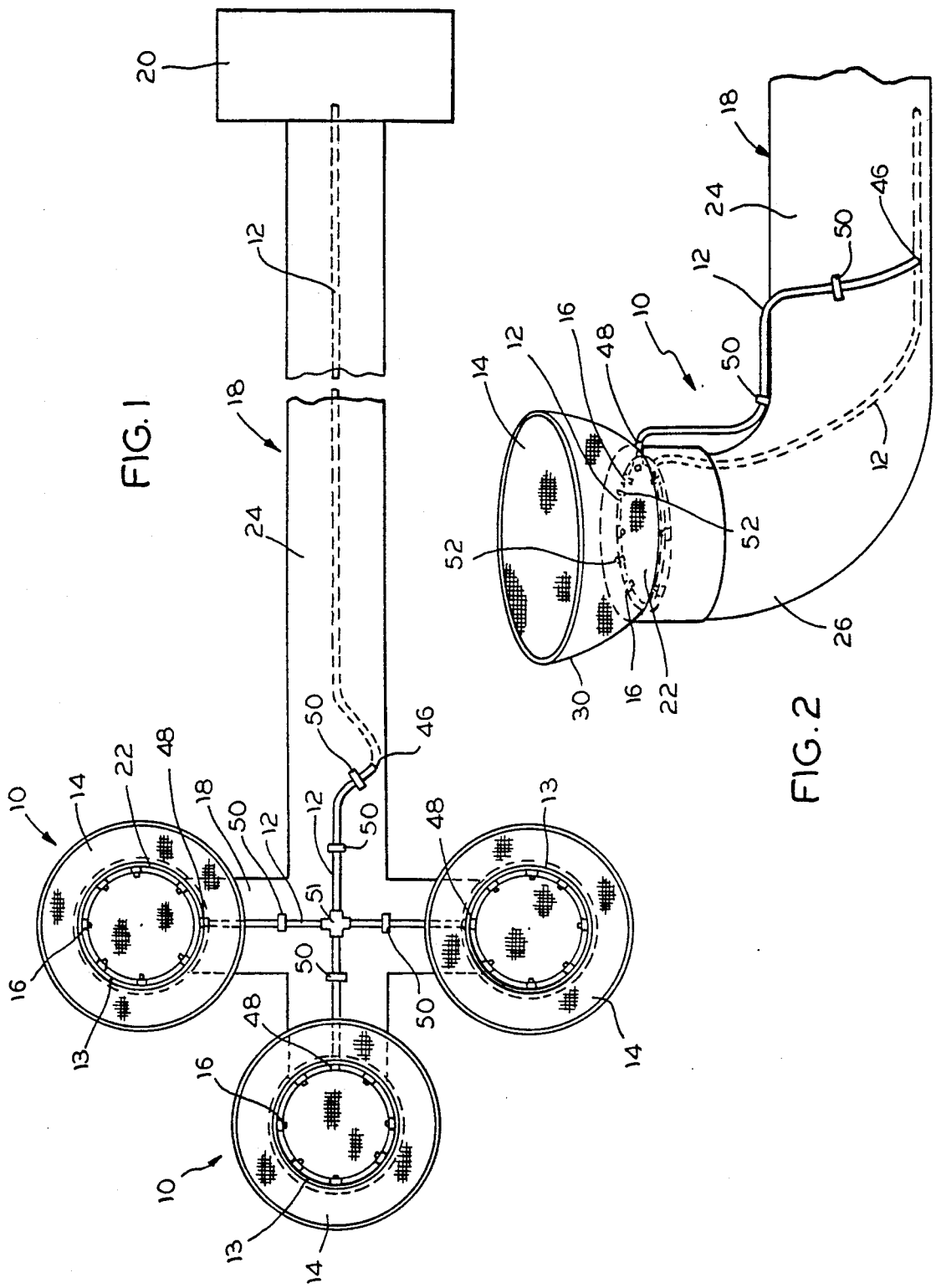

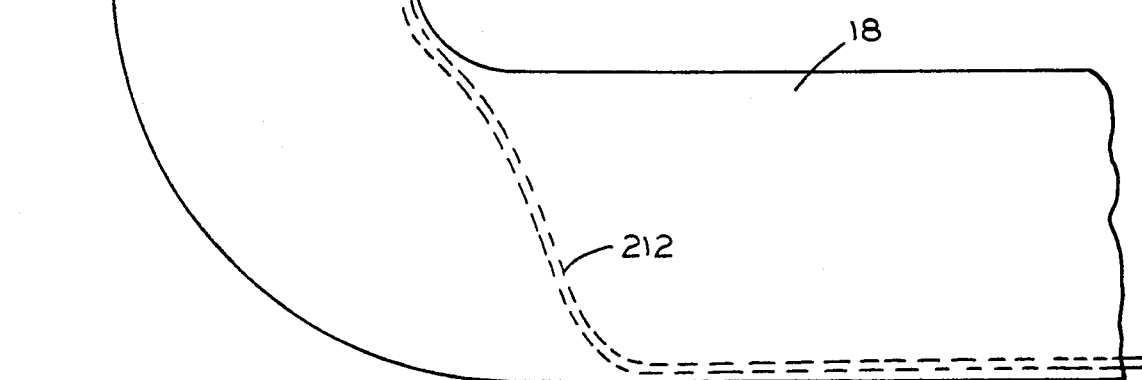
FIG.6
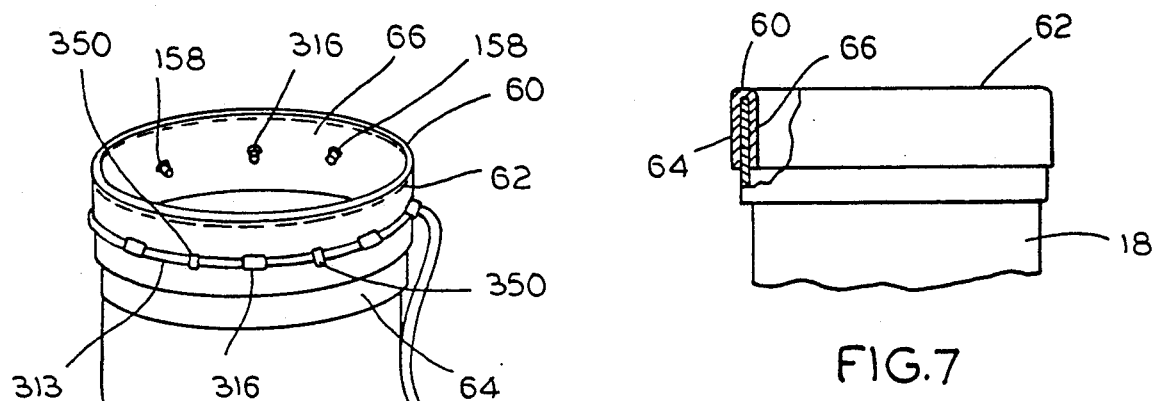
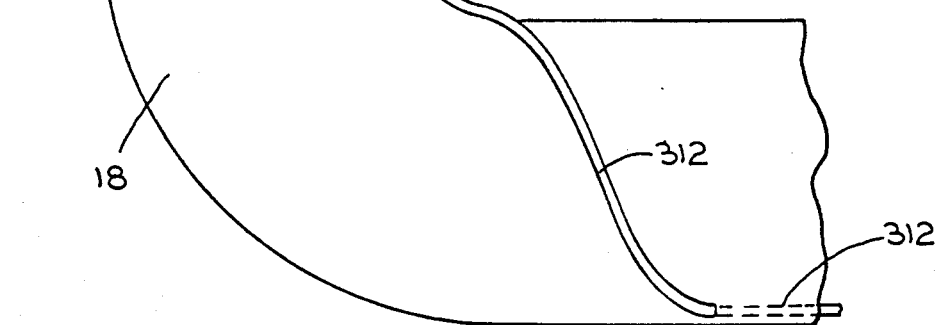
FIG.7
FIG.8

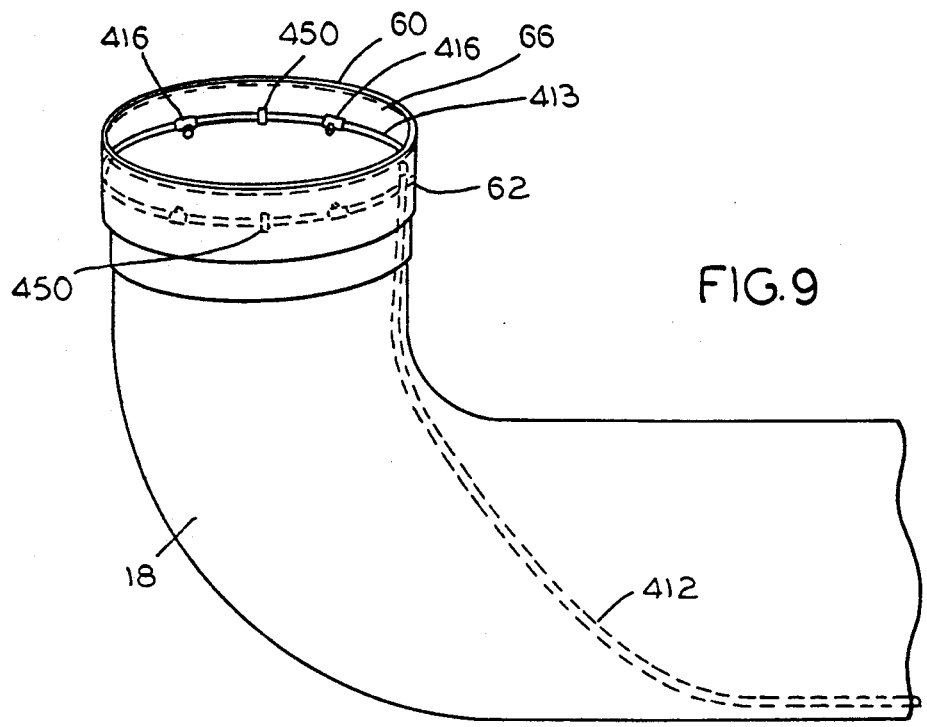
FIG.9
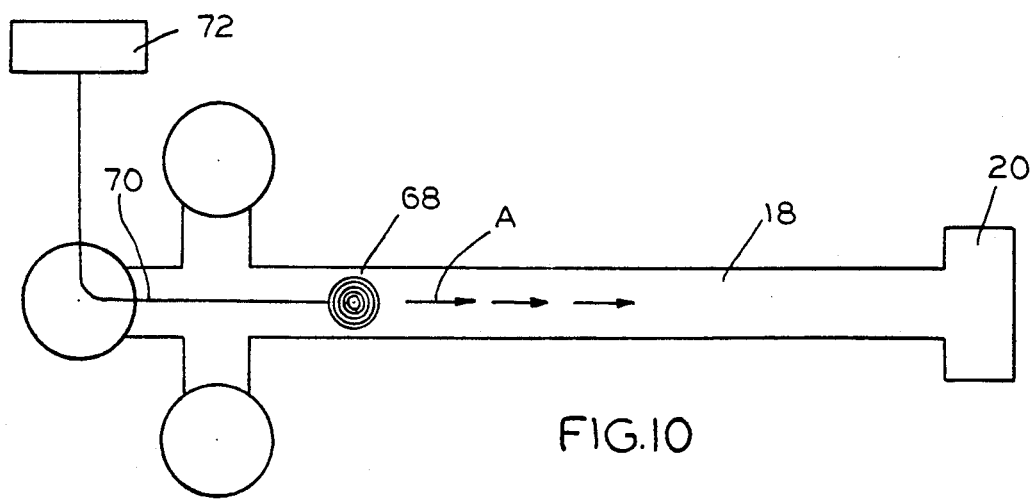
FIG.10
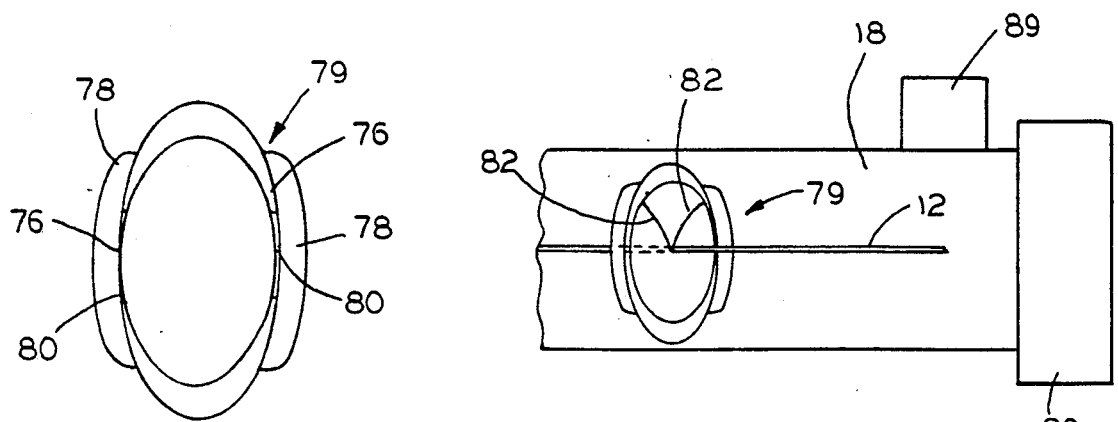
FIG.11
FIG.12

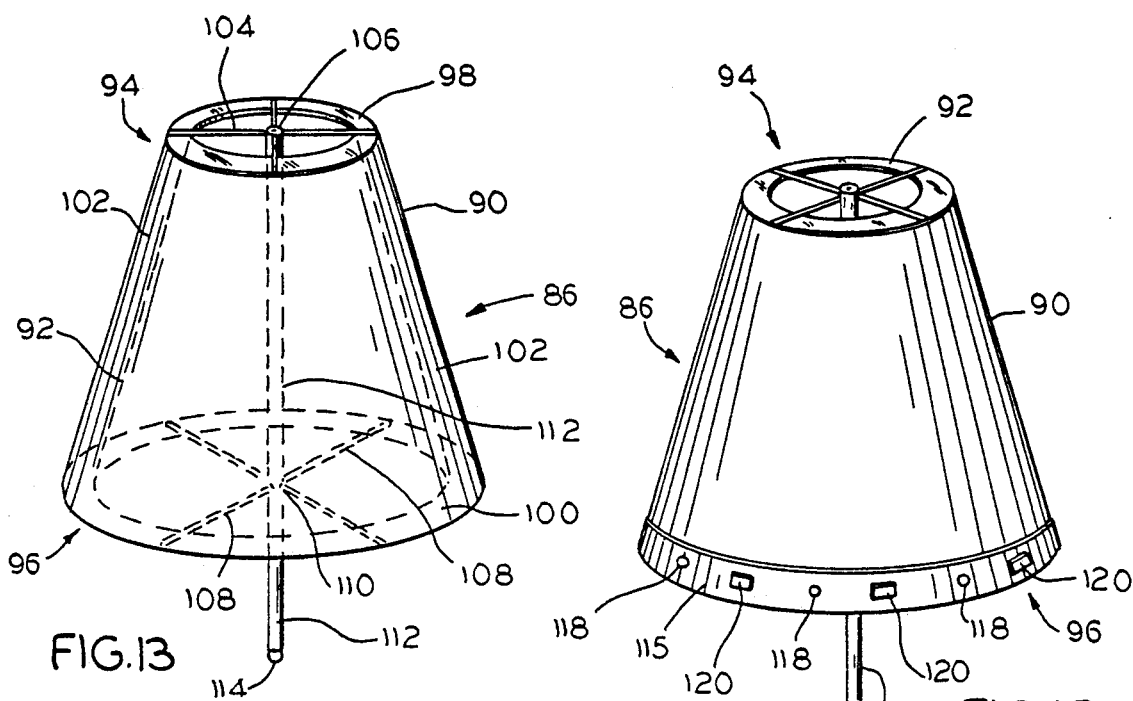
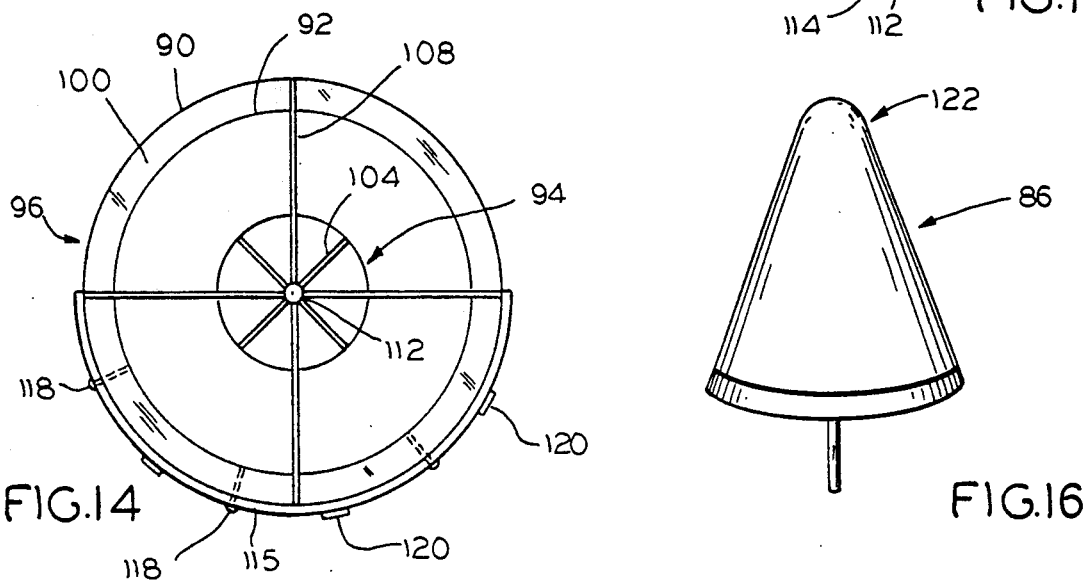
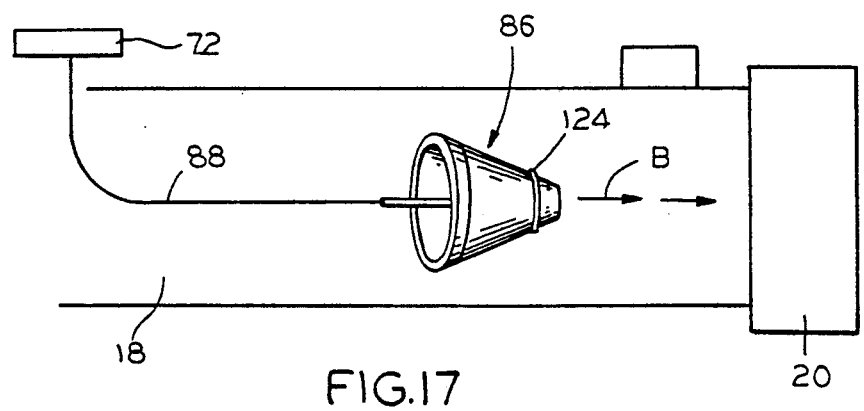

PREVENTATIVE MAINTENANCE SYSTEM FOR UNDERWATER PIPES

FIELD OF THE INVENTION

This is a continuation-in-part of application Ser. No. 07/464,958 filed Jan. 16, 1990 in the name of Paul G. Rufolo, covering "Preventative Maintenance System For Underwater Pipes" and now abandoned.

This invention relates to a preventative maintenance system and apparatus for protecting underwater pipes from blockage due to organism or animal growth in the pipes, such as zebra mussel infestation. More particularly, this invention relates to a preventative maintenance system for dispersing chemicals to underwater intake pipes to prevent and eliminate zebra mussel larvae and adults, and the growth of other undesirable sea life.

BACKGROUND OF THE INVENTION

Recently, several new sea life species, including a prolific European mussel known as the zebra mussel, have been discovered in North American waters. These recent immigrees have probably entered the North American waters as a result of discharges of freshwater ballast from ocean-crossing ships. While many new species will disturb the ecological relationships among native biota, the zebra mussel will probably be the species imparting the greatest devastation to the waters.

The zebra mussel or Dreissena polymorpha is a bivalve mollusk native to Europe. This organism has been unintentionally introduced into North American waters by the discharge of ballast water from transoceanic ships. The mollusk is generally discharged from the ballast in the form of larvae, but quickly grows to adult size. As adults, the zebra mussels continue to spread rapidly because the adults produce a free-floating reproductive stage called a veliger. Veligers are planktonic young that are produced for approximately six to eight months per year in temperate latitudes and are capable of drifting in currents for up to thirty days. Moreover, the mobility of the veliger in combination with the high fecundity of the female mussels can result in more than 60,000 veligers/m$^2$ which are capable of colonizing any firm substrate. With currents as the major dispersal mechanism to downstream areas, and the ability of veligers to attach themselves to boats as a dispersal mechanism to upstream areas, their rate of spread is fast and extensive.

The zebra mussel is not only harmful to water systems because of its extreme mobility and fecundity but also because it is equipped with a byssal apparatus that secretes horny threads and enables the mussel to climb and firmly attach itself to any solid surface. As a consequence, these mussels have already attached themselves to the submerged parts of municipal water systems, including intake pipes, which has greatly restricted the inflow of water to electrical generating and water treatment facilities by reducing the diameter of the intake pipes. When the diameter of the intake pipes is reduced, the influx of water volume through these same pipes drastically decreases. This reduced water flow through the pipes is partially due to the fact that zebra mussel larvae are approximately 200 micromesh which allows for the larvae to easily pass through the intake pipe screens and infest the interior of the intake pipes. The reduced water flow through the intake pipes is further complicated by the fact that these mussels have also attached themselves to the screens that cover the intake pipes, which further contributes to the blockage problem.

As these mussels are capable of colonizing any firm substrate, the mussels found on the intake pipes and intake pipe screens form colonies that are several inches thick. The intake pipes and intake pipe screens are exceptionally good for mussel colonization due to the abundance of food near intake pipes resulting from the presence of the intake pipe screens which function, in part, to filter out food from the flowing water. Thus, as these mussels continue to be dispersed throughout the waters, the intake pipes and screens of water systems, which are essential to water usage, will continue to be obstructed unless these mussels are eliminated immediately.

Some effort has been made, to date, to combat the zebra mussel problem. These efforts have included the installation of chlorination units at the water pump station. This proved ineffective, as the release of the chlorine at the pump house was unsafe without the installation of chlorine detection controls. Other efforts that have been considered for combating the zebra mussel problem include building an overland pipeline from the lake to the water system so as to provide an additional water source. This solution, however, is not economically feasible.

Accordingly, an object of the present invention is to provide a preventative maintenance system for protecting underwater pipes from zebra mussel and other sea life infestation that eliminates the mussels in both their adult and larvae stage.

Another object of the invention is to provide a preventative maintenance system for protecting underwater pipes from zebra mussel infestation that is compatible with existing intake pipes and screens.

Another object of the invention is to provide a preventative maintenance system for protecting underwater pipes from zebra mussel infestation that is assembled directly onto the intake pipes and screens.

Another object of the invention is to provide a preventative maintenance system for protecting underwater pipes from zebra mussel infestation having an underwater flexible feed piping that extends the length of the intake pipe and which is assembled in that portion of the intake pipe without the assistance of underwater divers.

Another object of the invention is to provide a preventative maintenance system for protecting underwater pipes from zebra mussel infestation having an apparatus that is mounted on the intake pipe or intake pipe screen and which is capable of withstanding the heavy volume of water flowing past same.

A further object of the invention is to provide a preventative maintenance system for protecting underwater pipes from mussel infestation that is relatively easy to construct and fast to assemble onto extant intake pipes and screens.

SUMMARY OF THE INVENTION

The present invention, in the preferred embodiment, comprises a system and structure that accomplishes the foregoing objects by providing a preventative maintenance system for protecting underwater pipes from mussel infestation having a flexible feed piping that extends the entire length of the intake pipe and which is circumferentially mounted onto the interior of the intake pipe screen. In the preferred embodiment, the flexible feed piping exits from the intake pipe at a point near the intake pipe opening, and then enters the intake pipe to connect with the flexible feed piping which is mounted to the interior of the intake pipe screen. The flexible feed piping extends the length of the intake pipe, and is attached to the interior of the intake pipe screen to dispense chemicals from a plurality of valves that protrude from the feed piping to effectively eliminate zebra mussel larvae and adults. In the preferred embodiment, the flexible feed piping may first be attached to the interior of the screen on land and then inserted into the underwater intake pipe.

In another embodiment, the inventive system accomplishes the aforementioned objects by attaching and mounting the flexible feed piping directly to the interior of the intake pipe and connecting same to flexible feed piping that remains in the interior of the intake pipe for its entire length.

In another embodiment, the inventive system accomplishes the aforementioned objects by attaching and mounting the flexible feed piping directly to the exterior of the intake pipe nearest the intake pipe opening, and releasing the chemicals from a plurality of valves located in the interior of the intake pipe.

In an additional embodiment, the inventive system accomplishes the aforementioned objects by attaching and mounting the flexible feed piping directly to the interior of the intake pipe nearest the intake pipe opening, and releasing the chemicals from a plurality of valves located in the interior of the intake pipe.

In a further embodiment, the inventive system accomplishes the aforementioned objects by attaching a U-shaped lip cover to the rim of the intake pipe, with one side of the lip facing the exterior of the intake pipe and the other side facing the interior of the intake pipe, in which the flexible feed piping is mounted to the exterior of the lip cover. The chemicals are released from a plurality of valves that project through the lip cover and which are located in the interior of the intake pipe.

In yet another embodiment, the inventive device also accomplishes the aforementioned objects by attaching a U-shaped lip cover to the rim of the intake pipe opening, and mounting the flexible feed piping to the interior of the lip cover. The chemicals are released from a plurality of valves that project out from the flexible feed piping located in the interior of the intake pipe In all of the aforementioned embodiments, the flexible feed piping that extends the length of the intake pipe may be assembled inside the intake pipe without the assistance of the underwater divers. This may be accomplished by one of several techniques, including a floatation ball technique, a cone-shaped apparatus, or a technique involving a pump propelled chasing device, such as a polypig.

The floatation ball technique involves attaching a floatation ball to a cable or rope which is caused to move by water suction through the intake pipe from the intake pipe opening towards the pump house. After the cable or rope is threaded through the intake pipe, the cable or rope is attached to the flexible feed piping and used to pull same through.

The feed piping assembly process using a cone-shaped apparatus involves attaching a specially designed double cone-shaped element to a cable or rope which is also caused to move by water suction through the intake pipe from the intake pipe towards the pump house. After the cable or rope is threaded through the intake pipe, the cable or rope is attached to the flexible feed piping and used to pull same through the length of the intake pipe.

The flexible feed piping is positioned into the intake pipe with the chasing device by attaching the feed piping to the chasing device and moving the chasing device through the pump house and towards the intake pipe opening by water pressure.

All of the above-described techniques enable the flexible feed piping to be positioned in the intake pipe without using underwater divers to feed the feed piping through the intake pipe.

The above, as well as other objects and advantages of the invention, will become apparent from the following detailed description of the preferred embodiments, reference being made to the accompanying drawings.

BRIEF DESCRIPTION OF THE DRAWINGS

FIG. 1 is a plan view of the preferred embodiment of the inventive feed pipes and intake pipe screens, as they appear mounted on intake pipes;

FIG. 2 is a side perspective view of a feed pipe and intake screen, illustrating alternate embodiments of the inventive chemical dispersing apparatus;

FIG. 6 is a side perspective view of another embodiment of the inventive chemical dispersing apparatus;

FIG. 7 is a side view of a U-shaped lip that covers the rim of the intake pipe;

FIG. 8 is a side perspective view of one form of the invention utilizing the U-shaped lip of FIG. 7;

FIG. 9 is a side perspective view of another form of the invention utilizing the U-shaped lip of FIG. 7;

FIG. 10 is a schematic plan view of the floatation ball method for inserting the inventive feed pipe into the intake pipe;

FIG. 11 is a side view of the polypig apparatus used to insert the inventive feed pipe into the intake pipe;

FIG. 12 is a side view of the polypig of FIG. 11 inserted in an intake pipe.

FIG. 13 is a perspective view of the cone-shaped apparatus for inserting the inventive feed piping into the intake pipe;

FIG. 14 is a bottom plan view of the cone-shaped apparatus of FIG. 13;

FIG. 15 is a side perspective view of the cone-shaped apparatus of FIG. 13, illustrating the metal bar that circumferentially extends around one-half of the bottom of the inventive cone-shaped apparatus;

FIG. 16 is a side view of another embodiment of the cone-shaped apparatus of FIG. 13; and FIG. 17 is a side view of the cone-shaped apparatus of FIG. 13 inserted into an intake pipe.

DETAILED DESCRIPTION OF THE INVENTION

Figure 3:
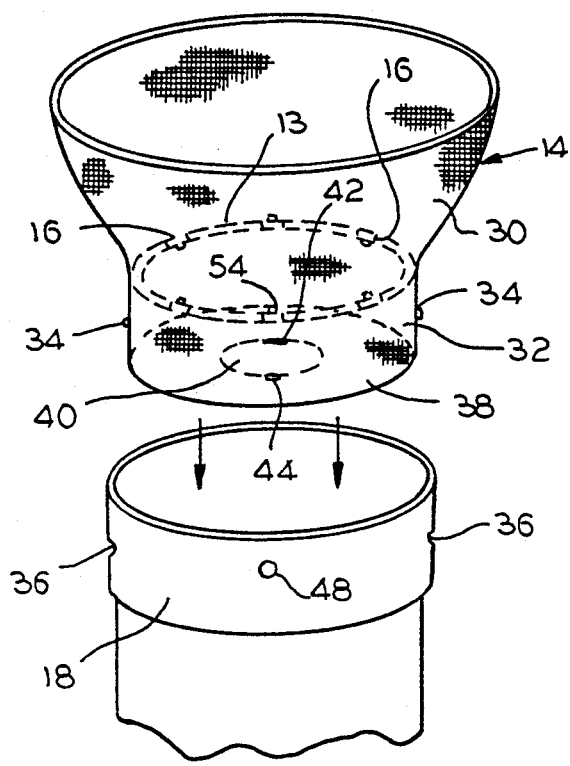
FIG. 3 is a fragmentary, exploded perspective view of the intake pipe screen and intake pipe of FIG. 1.

Referring first to a preferred embodiment as shown in FIG. 1, the invention provides a preventative maintenance system and apparatus for protecting underwater pipes from mussel and other sea life infestation, with the apparatus generally denoted by the numeral 10 having, in part, a substantially linear flexible feed piping 12 and a substantially circular flexible feed piping 13, an intake pipe screen 14, a plurality of inwardly radially extending chemical dispensing valves 16 and an intake pipe 18. Flexible feed piping 12 extends through the length of the inside of intake pipe 18, from a pump house 20 to an intake pipe opening 22 beneath the water level, wherein the piping 12 is then circumferentially mounted to the intake pipe screen 14 or to the intake pipe 18 adjacent the intake pipe opening 22. A plurality of chemical dispensing valves 16 protrude from that portion of feed piping 13 that is circumferentially mounted to the pipe screen 14 or intake pipe 18. The chemicals which are dispensed through the plurality of dispensing valves 16 are placed into the end of feed piping 12 located in the pump house 20.

FIGS. 1-9 show various embodiments of the apparatus 10 each of which will be described in more detail. In each of the embodiments, the linear flexible feed piping 12 extends through the length of the inside of intake pipe opening 22 at which point, in some of the embodiments, the feed piping 12 passes through the intake pipe to the exterior thereof and in other embodiments continues inside the intake pipe 18 until it reaches intake pipe opening 22. In either case, each flexible feed piping 13, which is connected to linear piping 12, is circumferentially mounted to the intake pipe 18 nearest the opening 22 or, in the preferred embodiment, each extent of piping 13 is circumferentially mounted to the pipe screen 14. It should be noted that a water system may have from one to three intake pipes. Thus, the configuration of the intake pipes shown in FIG. 1 is for purposes of illustration only and does not represent the exact number or relative positioning of the intake pipes. For example, a system may have three intake pipes in a linear configuration or the clover-leaf configuration of FIG. 1.

In the embodiment of Figs. 1-4, intake pipe 18 generally is J-shaped, with the long section of the pipe 18, as indicated by the numeral 24, extending along the bottom of the water body and the shorter section, as indicated by the numeral 26 (FIG. 2), projecting upwardly a distance from the long section 24. At the end of the shorter section 26 of pipe 18 and along its outermost perimeter 28 is the intake pipe opening 22. Intake pipe 18 is approximately 8 to 15 feet in diameter and approximately six inches in thickness. The pipe is concrete and includes a metal plate in the interior thereof.

Intake pipe screen 14 is generally funnel or cone shaped on its upper portion 30 and flattens out to a cylindrical shape on its lower portion 32, as shown in FIG. 3 with the lower portion 32 of the screen 14 being circumferentially parallel to intake pipe 18. As FIGS. 2 and 3 illustrate, screen 14 fits inside intake pipe 18 by inserting screen 14 into intake pipe opening 22. Since the design of screen 14 is such that the upper portion 30 flares outwardly, the screen 14 can extend into intake pipe 18 only to a certain point before its girth precludes screen 14 from extending any further into the intake pipe. The upper portion 30 of screen 24 extends beyond the perimeter of intake pipe 18 for a distance of approximately two to eight feet, such that as water flows into intake pipe opening 22, a greater amount of debris is filtered and precluded from entering into the intake pipe 18.

Screen 14 is constructed from any conventional non-corrosive metal mesh on its upper portion 30. The lower portion 32 of screen 14 is preferably made of steel so that feed piping 13 can be attached thereto, as will be discussed in greater detail. The steel found in the lower portion 32 of screen 14 further enables screen 14 to be attached to intake pipe 18 by two bolts 34 that fit into bolt openings 36 (see FIG. 3).

The bottom portion 38 of screen 14 includes a screened opening 40 that enables divers to pass into intake pipe 18. Screened opening 40 is made of the same mesh material as the rest of screen 14. Opening 40 includes hinge means 42 that allow it to open and close, and a locking mechanism 44 which maintains opening 40 in a closed position.

Referring to Figs. 1 and 2, flexible feed piping 12 extends the length of intake pipe 18, from pump house 20 to intake pipe opening 22, and connects to the flexible feed piping 13 mounted in the interior of intake pipe screen 14. In the preferred embodiment, feed piping 12 extends through the interior of the length of intake pipe 18 but then exits from intake pipe 18 through an opening 46 in pipe 18. As opening 46 is located along the bottom of intake pipe 18, feed pipe 12 exits from opening 46 and extends around the side of intake pipe 18 to the top thereof. Feed pipe 12 extends along the top of intake pipe 18 to intake pipe opening 22 whereupon feed pipe 12 re-enters intake pipe 18 at opening 48 and connects to the feed pipe 13 mounted on the intake pipe screen 14. Feed pipe 12 is attached to the exterior of intake pipe 18 by a plurality of concrete anchor clamps 50. In the configuration shown in FIG. 1, feed pipes 12 are connected by a juncture fitting 51 at their point of intersection. In another embodiment as illustrated by the broken line 12' in FIG. 2, feed pipe 12 does not exit from opening 46 in intake pipe 18 but instead remains inside of pipe 18 and connects to feed pipe 13 in the interior and at the end of pipe section 26.

In the preferred embodiment, feed pipe 13 is mounted on and attached to the interior of intake pipe screen 14. This procedure may be performed on land, where feed pipe 13 is welded to the lower portion 32 of screen 14 and may include non-corrosive clamps 52 for additional securement (FIGS. 3, 4).

Figure 4:
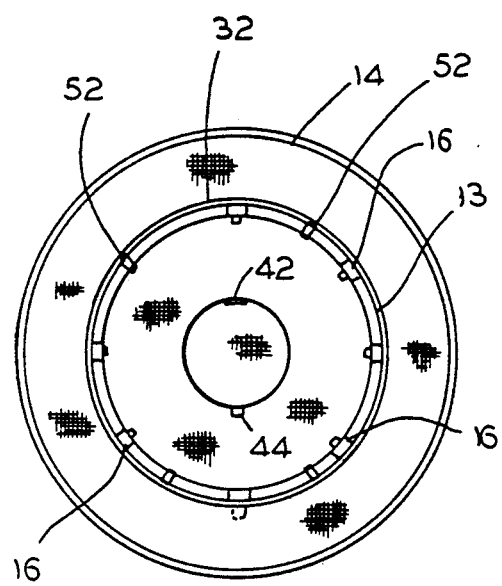
FIG. 4 is a plan view of the intake pipe screen of FIGS. 1 and 3.

In the preferred embodiment, a plurality of chemical dispensing valves 16 project inwardly from feed pipe 13, as shown in Figs. 1, 2 and 4, which sprays and dispenses the chemical solution that eliminates the zebra mussel larvae and adults. Valves 16 not only dispense the chemicals, but further serve as a connecting mechanism between each segment of flexible feed pipe 13.

After feed pipe 13 has been welded and otherwise attached to intake pipe screen 14, screen 14 is inserted into intake pipe 18, as shown in FIG. 3. Screen 14 is attached to intake pipe 18 by inserting bolts 34 into bolt openings 36 of intake pipe 18. Feed pipe 13 of screen 14 is then connected to the feed pipe 12, that extends along the length of intake pipe 18, by means of connector means 54, as shown in FIG. 3. Connector means 54 projects outwardly from feed pipe 13 and passes through opening 48 of intake pipe 18 whereupon feed pipe 12 is connected thereto.

Another embodiment includes mounting flexible feed pipe 13 into the interior of intake pipe screen 14, the same as in the preferred embodiment However, in this embodiment, feed pipe 12 does not exit from opening 46 of intake pipe 18 but instead continues through the interior of intake pipe 18, as shown by the broken line 12' in FIG. 2, and up through the shorter segment 26, where it connects to feed pipe 13 on the inside of intake pipe 18. Feed pipe 12' is connected to feed pipe 13 using the valve mechanism 54 described in the preferred embodiment. However, the valve mechanism 54 will not project outwardly from feed pipe 13 and pass through intake pipe 18, but instead will project inwardly without passing through intake pipe 18. All other aspects of this embodiment are the same as those described in the preferred embodiment.

Figure 5:
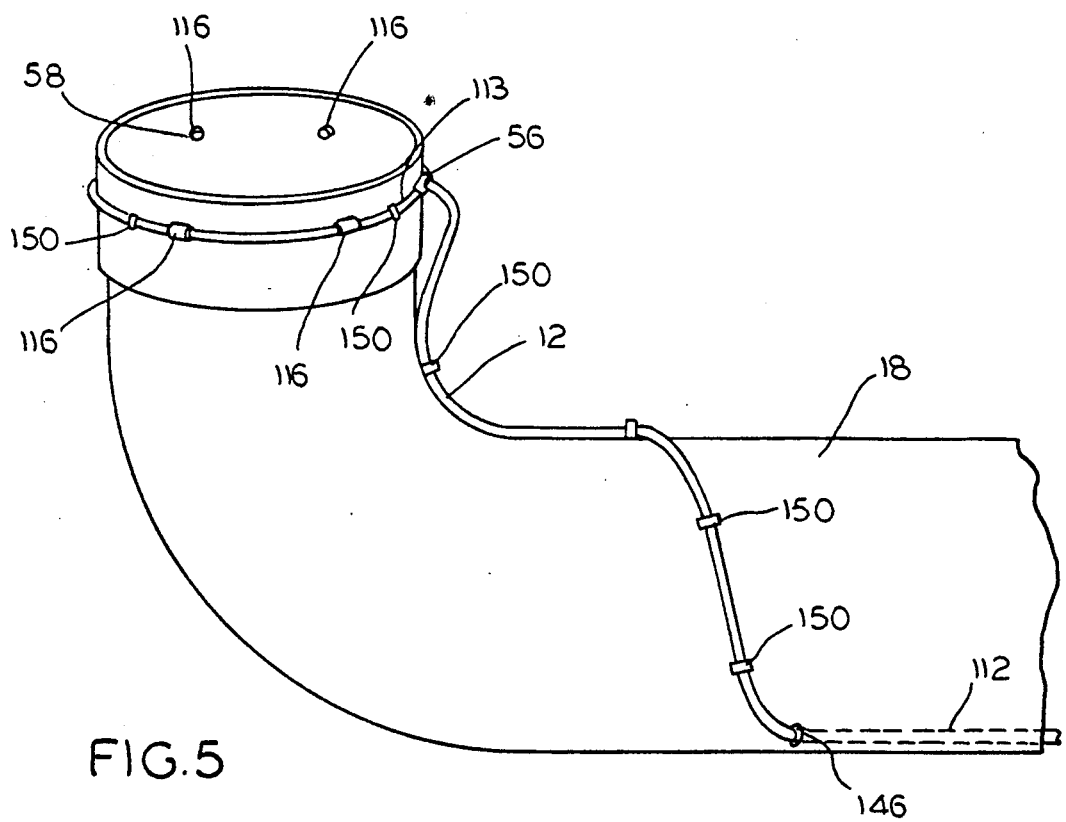
FIG. 5 is a side perspective view of another embodiment of the inventive chemical dispersing apparatus for feed pipes.

FIG. 5 shows another embodiment in which the feed pipe 13 of the preferred embodiment is attached directly to the external surface of shorter section 26 of intake pipe 18 through the intake pipe opening 22. Thus, FIG. 5 illustrates feed pipe 112 extending through the inside length of intake pipe 18 and exiting therefrom at opening 146. Feed pipe 112 is attached to the exterior of intake pipe 18 by concrete anchor clamps 150 and extends up to feed pipe 113 which is circumferentially mounted to the exterior of intake pipe 18 by clamps 150. Feed pipe 112 is connected to feed pipe 113 by a juncture fitting 56. Chemical dispensing valves 116 connect the segments of feed pipe 113 and project through intake pipe 18 through a plurality of openings 58. Thus, the chemical solution is dispensed inside of intake pipe 18.

FIG. 6 shows a further embodiment which involves mounting flexible feed pipe 13 of the preferred embodiment directly to the interior surface of shorter section 26 of intake pipe 18. In this embodiment, feed pipe 212 extends through the inside length of intake pipe 18 until it reaches intake pipe opening 22. Thus, feed pipe 212 does not exit from intake pipe 18. Feed pipe 212 is connected to feed pipe 213, which is mounted to the interior of intake pipe 18 by an internal juncture fitting 156. Feed pipe 213 is mounted on the interior of intake pipe 18 by clamps 250 and includes chemical dispensing valves 216 facing radially inward.

FIGS. 7-9 illustrate additional embodiments wherein a U-shaped lip 60 completely covers the rim 62 of segment 26 of intake pipe 18, with the external side 64 of lip 60 being on the outside of intake pipe 18 and the internal side 66 of lip 60 being on the inside of intake pipe 18. In the embodiment shown in FIG. 8, feed pipe 312 is connected to feed pipe 313, the latter which is mounted by clamps 350 to lip 60 on the external side 64. Chemical dispensing valves 316 connect the various segments of feed pipe 313, and radially project into the interior of intake pipe 18 through openings 158. Thus, the chemical solution is dispensed inside of intake pipe 18.

In the embodiment shown in FIG. 9, feed pipe 412 is connected to feed pipe 413, the latter being mounted by clamps 450 to lip 60 on the internal side 66. Chemical dispensing valves 416 connect the segments of feed pipe 413 and dispense the chemical solution inside intake pipe 18 as previously described.

In all of the embodiments of FIGS. 1-9, the flexible feed piping 12, 112, 212, 312, 412 that extends through the interior of intake pipe 18 may be assembled therein by either of the following methods illustrated in FIGS. 10-17.

FIG. 10 illustrates the floatation ball technique which involves attaching floatation ball 68 to cable or rope 70. Cable or rope 70 is attached to barge 72. Ball 68, along with cable or rope 70, is caused to move in the direction of arrow A by water suction through intake pipe 18 and towards pump house 20. When ball 68 reaches pump house 20, that portion of cable or rope 70 which is in pump house 20 is attached to feed pipe 12. Cable or rope 70 is then pulled back through intake pipe 18 towards intake pipe opening 22 by a rotating mechanism on barge 72. As cable or rope 70 is pulled through intake pipe 18, feed pipe 12 is also moved through intake pipe 18.

FIGS. 11-12 illustrate a technique that moves feed pipe 12 through intake pipe 18 by use of a pump propelled chasing device 79, such as a polypig device. Chasing device 79 generally includes a steel plate 76 that is surrounded by and attached to an inner tube 78 by bolts 80. Feed pipe 12 is connected to chasing device 74 by cables 82 or other connecting means. A pump 89 is attached to intake pipe 18 for pumping water from the pump house 20 towards the intake pipe opening 22. The water pressure generated by pump 84 moves chasing device 79 towards the intake pipe opening 22 and thereby pulls feed pipe 12 through intake pipe 18.

FIGS. 13-17 illustrate the cone-shaped apparatus technique for advancing the feed piping 12 through the intake pipe 18, which generally involves attaching cone-shaped apparatus 86 to cable or rope 88. Similar to the embodiment illustrated in FIG. 10, cable or rope 70 is attached to barge 72. Referring to FIG. 17, cone-shaped apparatus 86, along with cable or rope 88, is caused to move in the direction of arrow B by water suction through intake pipe 18 and towards pump house 20. When cone-shaped apparatus 86 reaches pump house 20, that portion of cable or rope 88 which is in pump house 20 is attached to feed piping 12. Cable or rope 88 is then pulled back through intake pipe 18 towards intake pipe opening 22 by a suitable rotating mechanism on barge 72. As cable or rope 88 is pulled through intake pipe 18, feed piping 12 is also moved through intake pipe 18.

Referring to FIG. 13, cone-shaped apparatus 86 comprises an outer cone element 90 that is attached to an inner cone element 92 at a small end 94 and a large end 96 of cone-shaped apparatus 86 by first and second ring-like structures 98 and 100, respectively. The outermost perimeter of first ring-like structure 98 is preferably welded or fused to outer cone 90, and the innermost perimeter of second ring-like structure 100 is preferably welded or fused to inner cone 92. An air pocket is created in the space 102 between outer cone 90 and inner cone 92, to provide cone-shaped apparatus 86 with additional buoyancy. Both small end 94 and large end 96 have open ends.

A plurality of spokes extend across small end 94 and large end 96 of cone-shaped apparatus 86, as shown in FIGS. 13 and 14. First spokes 104 extend across small end 94 and intersect at a centralized point 106. First spokes 104 also extend through inner cone 92 and outer cone 90 and thus serve to additionally secure the cones to each other.

Second spokes 108 extend across large end 96 of cone-shaped apparatus 86 and intersect at a centralized point 110. Second spokes 108 also extend through inner cone 92 and outer cone 90 and therefore, secure cones 90, 92 at large end 96.

A bar 112 extends downwardly from the center 106 of intersecting spokes 104 of small end 94 through the Center 110 of intersecting spokes 108 of large end 96, and then further extend beyond large end 96 for a distance of approximately one to two feet. A swivel hook 114 is located on the bottom extended portion of bar 112. Swivel hook 114 may be attached to cable or rope 88.

FIGS. 14 and 15 show plate 115 which extends circumferentially around one-half of the exterior of outer cone 90 which is located nearest to large and 96 plate 115 is approximately three to six inches in width and ¼ to one inch in thickness. Plate 115 is attached to the exterior of large cone 90 by a plurality of bolts 118 which extend through both large cone 90 and small cone 92 plate 115 is adapted to hold magnetic weights 120 to allow for weight adjustment of cone-shaped apparatus 86.

FIG. 16 shows another embodiment of cone-shaped apparatus 86. This embodiment includes a closed and 122 in outer cone 90. All other aspects of this embodiment, aside from the closed end 122, are the same as the embodiment shown in FIGS. 13-15 and 17.

A floatation tube 124 (see FIG. 17) may be placed around the small end 94 of outer cone 90, if necessary, to maintain the conical axis of cone-shaped apparatus 86 in a horizontal plane.

FIG. 17 demonstrates the manner in which cone-shaped apparatus 86 is positioned in intake pipe 18. As FIG. 17 shows, small end 94 of apparatus 86 faces towards pump house 20 and the large end 96 faces towards the intake pipe opening. As previously described, cable or rope 88 is attached to apparatus 86 by swivel hook 114 of bar 112. Apparatus 86 is moved through intake pipe 18 in the direction of arrow B in the manner previously explained.

Apparatus 86 is generally made of a material that is buoyant, such as plastic or fiberglass. The size of apparatus 86 is variable and depends on the size of the intake pipe which it moves through.

The embodiments shown in Figs. 1-9 operate by adding a chemical solution to feed pipe 12 at that portion of feed pipe 12 located in pump house 20. The solution travels through the intake pipe 18 via feed pipe 12 to each intake pipe opening 22 through junction fitting 51. At the intake pipe opening 22, the solution in feed pipe 12 flows, through juncture fittings 48, into each feed pipe 13 which is mounted on intake pipe screen 14, or directly on the exterior or interior of intake pipe 18 in accordance with the teachings of the preferred embodiments. The solution then flows through feed pipe 13 and is dispensed in an inwardly radial direction out of dispensing valves 16 into intake pipe 18. The solution may be dispensed as frequently as desired. When the solution contacts the mussels, it destroys them.

The materials from which the feed pipe of the inventive apparatus are constructed include any material which is compatible with the chemical solution being dispensed. The valves and juncture fitting should be made from non-corrosive materials. The intake pipe is usually made from steel and concrete. The intake pipe screen is also made from any non-corrosive metal mesh on its upper portion and any non-corrosive metal on its lower portion.

Furthermore, in all of the previously described embodiments, shut-off valves may be installed in the long section of the chemical feed pipe. A diver will then be able to enter the intake pipe, shut off the valves and apply hydrostatic pressure to the feed pipe to determine if the feed piping is leaking or if any feed piping lines are blown out.

Moreover, the above apparatus has not been described in terms of approximate measurements of the various components, as it should be understood that the size of the feed pipes 12, 13, screen 14 and intake pipe 18, may vary according to need. Thus, there may be a plurality of sizes of the above components. The sizes can vary, but are limited to the manufacturing equipment's capabilities.

Therefore, it should be recognized that, while the invention has been described in relation to a preferred embodiment thereof, those skilled in the art may develop a wide variation of structural details without departing from the principles of the invention. Therefore, the appended claims are to be construed to cover all equivalents falling within the true scope and spirit of the invention.

The invention claimed is:

1. An apparatus for the unattended dispersement of chemicals to be mixed into a flowing liquid passing into an underwater pipe, said apparatus comprising a first chemical feed pipe, a second chemical feed pipe, and a water intake pipe, said feed pipes being mounted to said intake pipe and said intake pipe forming part of said underwater pipe, said first feed pipe extending along the length of said intake pipe and being connected to said second feed pipe, said second feed pipe being mounted to said intake pipe at that portion of said intake pipe adjacent an intake opening of said pipe, said second feed pipe including a plurality of dispensing valves extending closely adjacent an entrance of said intake pipe to release chemicals in an unattended manner directly into liquid passed into said intake pipe, sufficient to dispense toxic chemicals substantially throughout the length of said pipe and onto organisms within said pipe, said chemicals being delivered to said second feed pipe through said first feed pipe.

2. The apparatus of claim 1 wherein a mesh screen is mounted to said intake pipe and covers said intake pipe opening.

3. The apparatus of claim 1 wherein said second feed pipe is attached to the exterior of said intake pipe.

4. The apparatus of claim 1 wherein said second feed pipe is attached to the interior of said intake pipe.

5. The apparatus of claim 1 wherein said second feed pipe has a substantially circular configuration.

6. The apparatus of claim 1 wherein said dispensing valves are inwardly radially extending.

7. Apparatus according to claim 1 wherein said dispensing valves extend directly within said entrance to said intake pipe.

8. The apparatus of claim 1 wherein said second feed pipe is mounted to said intake pipe by attachment of said second feed pipe to a U-shaped lip element, said U-shaped lip element circumferentially covering a rim of said intake pipe opening.

9. The apparatus of claim 8 wherein said second feed pipe is attached to an internal side of said lip and said plurality of dispensing valves radially project inwardly from said second feed pipe.

10. The apparatus of claim 8 wherein said second feed pipe is attached to an external side of said lip and said plurality of dispensing valves protrudes from an internal side of said lip.

11. The apparatus of claim 10 wherein said plurality of dispensing valves radially project inwardly.

12. A method for the unattended dispersement of chemicals into a flowing liquid passing into an underwater pipe comprising first and second interconnected chemical feed pipe elements located at an intake pipe at an intake end of said underwater pipe, said second feed pipe element including a plurality of dispensing valves that release a chemical solution directly into the flowing liquid passing into said intake pipe, comprising the steps of: passing said chemical solution into said first fed pipe element, passing said chemical solution through said first feed pipe element and into said second feed pipe element, and releasing said chemical solution through said plurality of dispensing valves directly adjacent an entrance to said intake pipe to mix said chemical solution into flowing liquid passed into said intake pipe, in an unattended manner and in an amount sufficient to dispense chemicals onto organisms within said pipe.

13. The method of claim 12 wherein said first feed pipe element is positioned in si intake pipe by a floatation ball before chemical solution is passed therethrough.

14. The method of claim 12 wherein said first feed pipe element is positioned in said intake pipe by a chasing device before chemical solution is passed therethrough.

15. The method of claim 12 wherein said first feed pipe element is positioned in said intake pipe by a cone-shaped apparatus before chemical solution is passed therethrough.

16. Apparatus according to claim 12 wherein said chemical solution is released through said plurality of dispensing valves directly within an entrance to said intake pipe to mix said chemical solution into said liquid passed into said intake pipe.

17. Apparatus for dispensing chemicals to be mixed into water passing into an underwater pipe which comprises:

(a.) an underwater pipe having a water intake pipe section containing a section sidewall encompassing a water intake opening;

(b.) a first chemical feed pipe in fluid communication with a chemical solution source;

(c.) a second chemical feed pipe in fluid communication with said first chemical feed pipe and attached at said water intake opening; and, (d.) at least one chemical solution dispensing means in fluid communication with said second chemical feed pipe, each dispensing means having a dispensing opening positioned to dispense chemical solution into water entering said water intake opening.

18. Apparatus according to claim 17 wherein each dispensing opening is positioned adjacent the inside surface of said water intake pipe section sidewall.

19. Apparatus of claim 17 wherein a plurality of dispensing means are mounted on said second chemical feed pipe.

20. Apparatus according to claim 19 wherein each dispensing opening is positioned adjacent the inside surface of said water intake pipe section sidewall.

21. Apparatus according to claim 17 wherein said water intake opening is encompassed by a water intake screen.

22. Apparatus according to claim 21 wherein each said dispensing opening of said chemical solution dispensing means is positioned between said screen and said water intake opening.

23. Apparatus according to claim 21 wherein at least a portion of said second chemical feed pipe is positioned between said screen and said water intake opening.

24. Apparatus according to claim 23 wherein said second chemical feed pipe includes a circular pipe configuration between said screen and said water intake opening.

25. Apparatus according to claim 24 wherein a plurality of chemical solution dispensing means is mounted on said circular pipe configuration.

26. Apparatus of claim 17 wherein said second chemical feed pipe includes a circular pipe configuration adjacent said water intake opening.

27. Apparatus of claim 26 wherein said circular pipe configuration is mounted to the inside surface of said water intake pipe section sidewall.

28. Apparatus according to claim 27 wherein a plurality of dispensing means are mounted on said circular pipe configuration.

29. Apparatus according to claim 28 wherein said dispensing means are adjacent the inside surface of said sidewall.

30. Apparatus of claim 26 wherein said circular pipe configuration is mounted to the outside surface of said water intake pipe section sidewall.

31. Apparatus according to claim 30 wherein a plurality of dispensing means are mounted on said circular pipe configuration.

32. Apparatus according to claim 31 wherein said dispensing means pass through said section sidewall and said dispensing openings are adjacent the inside surface of said sidewall.

33. Apparatus according to claim 31 wherein said dispensing means pass through said section sidewall and said dispensing openings are positioned within said water intake pipe section.

* * * * *

UNITED STATES PATENT AND TRADEMARK OFFICE
CERTIFICATE OF CORRECTION

PATENT NO. : 5,008,075
DATED : April 16, 1991
INVENTOR(S) : Paul G. Rufolo

It is certified that error appears in the above-identified patent and that said Letters Patent is hereby corrected as shown below:

In Column 1, Line 21, "hew" should be --new--.

In Column 3, Line 46, after "pipe" insert a period.

In Column 6, Line 60, after "embodiment" insert a period.

In Column 8, Line 12, "84" should be --89--.

In Column 8, Line 59, "Center" should be --center--.

In Column 8, Line 67, "and 96 plate" should be --end 96. Plate--.

In Column 9, Line 4, "92 plate" should be --92. Plate--.

In Column 9, Line 8, "and" should be --end--.

UNITED STATES PATENT AND TRADEMARK OFFICE
CERTIFICATE OF CORRECTION

PATENT NO. : 5,008,075

DATED : April 16, 1991

INVENTOR(S) : Paul G. Rufolo

It is certified that error appears in the above-identified patent and that said Letters Patent is hereby corrected as shown below:

Column 11, line 8, "si" should be --said--.

Signed and Sealed this

Twenty-fourth Day of November, 1992

Attest:

DOUGLAS B. COMER

Attesting Officer

Acting Commissioner of Patents and Trademarks